Patented Aug. 25, 1942

2,293,716

UNITED STATES PATENT OFFICE 2,293,716

METAL TREATING SOLUTION

Van M. Darsey, Detroit, Mich., assignor to Parker Rust Proof Company, Detroit, Mich.

No Drawing. Application February 3, 1941, Serial No. 377,205

17 Claims. (Cl. 148—6.5)

This invention relates to the chemical treatment of metals, particularly for the purpose of providing an improved corrosion-resistant and paint-holding surface. Solutions containing acid phosphates as the coating ingredients are well known and extensively used for producing insoluble coatings on such metals as iron and zinc. Increased production rates have necessitated the development of extremely short processing periods and it has become the usual practice to use phosphate solutions whose coating action is accelerated by the presence of nitrates. Metal accelerators, such as copper, may also be present in small amounts to further improve the coating.

A solution typical of those which have been widely accepted contains zinc dihydrogen phosphate, a nitrate and a small amount of copper. The conventional method of operating comprises the use of a conveyor system in which the solution is continuously sprayed, recirculated and resprayed. In many cases, however, the work is immersed in the coating solution. Coatings of the type described are obtained in as little as one minute and less. However, in order to accomplish this it is necessary to maintain a temperature as high as 170° F. and higher. This is objectionable because of cost of heating the solution. The hot moist vapors from the solution may also cause incipient rust to form after the coating operation, especially in case the conveyor line stops or when the coating produced is thinner than usual. The latter may be either the result of poor cleaning which retards the starting of the coating action or may be due to an extra hard metal surface which is slow to react with the coating solution. In addition to those factors, when the metal is cleaned with strongly alkaline solutions, coatings produced by baths of the kind described are coarse and cause a dull appearance in paint finishes applied to them.

These conditions might be overcome if a sufficiently long period could be used to produce heavy coatings but the processing time is incapable of more than a minor variation with conveyor equipment where the speed of a good many other operations is usually governed by the same mechanism.

The object of my invention is a new processing composition which eliminates or greatly alleviates the difficulties set forth.

The invention resides primarily in the use of a coating composition containing a dihydrogen phosphate, a nitrate, and a chlorate with or without a metal accelerator.

I have discovered that the addition of a chlorate to the usual type of rustproofing composition makes it possible to operate at considerably lower temperatures and excellent coatings are still produced in one minute or less. The possibility of coarsely crystalline coatings rusting from high alkalinity in the cleaner is likewise minimized.

Extremely fine grained coatings as developed with my new composition are more economical to produce than those obtained in the absence of a chlorate since a thinner layer is adequate for the protection of the metal surface.

A concentrated composition suitable for preparing a coating bath may be made with the following proportions of chemicals:

| | Pounds |
|---|---|
| 52° Bé. nitric acid | 400 |
| 75% phosphoric acid | 1,075 |
| Zinc oxide | 420 |
| Sodium chlorate | 500 |
| Copper carbonate | 2.5 |
| Water to make | 5,000 |

The processing bath is made by diluting this material with water. A ratio of 500 pounds of the concentrated material to 1000 gallons of water has been found satisfatcory.

A typical operating bath will have the approximate analysis:

| | | |
|---|---|---|
| Free acid | cubic centimeters | 1.5 |
| Total acid | do | 15.4 |
| Zinc | per cent | .52 |
| $NO_3$ | do | .56 |
| $ClO_3$ | do | .40 |
| Cu | do | .0008 |
| $PO_4$ | do | .68 |

The free and total acid referred to are indicated by the number of cubic centimeters of N/10 sodium hydroxide required to titrate a 10 cc. sample of the solution when methyl orange and phenolphthalein are used respectively as indicators. This solution operates successfully at a temperature as low as 115° F. In ordinary commercial operation of a spray process where the coating solution is not heated the temperature does not get above 130° F.

As a specific illustration of the use of my composition, metal, such as steel automotive parts, are suspended from a conveyor by which they are carried through a series of treatments. They are first cleaned of oil and drawing compound with a suitable emulsion type or alkali cleaner, then water rinsed. They next enter the rustproofing spray chamber where they are impinged from all sides by a spray of the rustproofing composition for a period of approximately one minute. A reservoir of suitable capacity furnishes the solution and also acts as a collector when it runs from the pieces being coated. The next step is a water rinse which is usually followed by a final rinse in a dilute solution of chromic acid or a dichromate. After the articles are force dried they are ready to be finished with paint.

The coating process results in a consumption of chemicals the rate of which is related to the amount of production. It is therefore necessary to replenish the bath with a composition adapted to maintain the analysis of the solution substantially constant. A composition suitable for replenishing may be prepared in the following proportions:

| | Pounds |
|---|---|
| 42° Bé. nitric acid | 425 |
| 75% phosphoric acid | 2,240 |
| Zinc oxide | 670 |
| Sodium chlorate | 448 |
| Copper carbonate | 22 |
| Water to make | 5,250 |

It will be noted that the proportions of chemicals are different than in the formula for preparing the bath. This is necessary because of the different rates at which the various ingredients are consumed.

It is advisable to replenish the coating bath continuously during production by running into the reservoir a small stream of the concentrated material. The quantity to be added is easily determined by running periodic tests on the processing solution.

In general, coating solutions of the kind described operate most efficiently at a pH value above 2.5.

It has been found that when copper is present in the solution, a pH of 2.7 gives excellent results, while if copper is not employed a value approximately .2 higher is preferred. These conditions not only aid in the consistent production of high quality coatings but also reduce to a minimum the possibility of rust forming on the work when the conveyor is temporarily stopped. Even a slight addition of caustic soda or other material to raise the pH has some advantage, but in general the pH should be raised to above 2.5, and in most cases to at least 2.7 for best results.

In instances where a pH adjustment is necessary, it is easily brought about by the addition of a solution of caustic soda or an equivalent alkaline reacting substance. Substantially continuous addition of an aqueous solution is preferred because a more uniform control of the solution is possible and it is more convenient than when the solid material is used.

Solutions having a pH higher than 2.9 are capable of producing very good coatings, but as the pH increases, the consumption of coating chemicals also increases due to the formation of excessive amounts of sludge.

The pH values referred to above were determined by a Beckman industrial meter referring to M/20 potassium acid phthalate buffer=3.97 at room temperature. The samples were filtered while hot, and cooled to room temperature before the determinations were made.

Although my composition is of particular importance in the treatment of ferrous objects, it is also of value in the coating of non-ferrous metals such as zinc and cadmium.

It is also applicable where the metal is coated by immersion as well as by the spray method.

It has been found that in treating the usual type of cleaned metal it is not necessary to apply any heat to the processing bath during operations. If desired, some heat may be applied when starting operations after the solution has been allowed to cool to room temperature. The cleaning operation is usually carried out at a temperature of 150° to 160° F. and the rinse which follows it is also kept hot. The heat of the cleaned metal has been found to be sufficient to maintain the bath at a sufficiently high temperature.

In the formulas given for the preparation and replenishing of the coating bath the nitrate is present as zinc nitrate and this is a definite advantage because the coating metal content of the bath is consequently increased but it is to be understood that this oxidizing agent may be furnished by alkali metal nitrates or nitrates of other metals not detrimental to the action of the bath. The chlorate may also be furnished by salts other than sodium chlorate.

It will be noticed that the formulas given contain a small quantity of copper. This is of some value when particularly hard surfaced metal is treated or when the processing time is materially less than one minute. Its presence however is not essential and it may be omitted. The proportions of the ingredients may vary considerably, but those given in the examples are good operating proportions. It is possible to get an amount of chlorate in the bath, which is excessive for best results, but the operator may easily regulate the amount of the replenishing to avoid an excess.

The invention may be used with other coating dihydrogen phosphates such as those of manganese, but zinc phosphate is preferred.

What I claim is:

1. A process which comprises treating surfaces of one of the group consisting of iron, steel, zinc and cadmium with an acid phosphate coating solution containing nitrate and chlorate.

2. A process which comprises treating surfaces of one of the group consisting of iron, steel, zinc and cadmium with an acid phosphate coating solution containing nitrate and chlorate and maintaining the pH of the bath above 2.5.

3. A process which comprises treating surfaces of one of the group consisting of iron, steel, zinc and cadmium with an acid phosphate coating solution containing nitrate and chlorate and maintaining the pH of the bath above 2.5 and not over 2.9.

4. A process which comprises treating surfaces of one of the group consisting of iron, steel, zinc and cadmium with an acid zinc phosphate coating solution containing nitrate and chlorate.

5. A process which comprises treating surfaces of one of the group consisting of iron, steel, zinc and cadmium with an acid zinc phosphate coating solution containing nitrate and chlorate and maintaining the pH of the solution above 2.5.

6. A process which comprises treating surfaces of one of the group consisting of iron, steel, zinc and cadmium with an acid zinc phosphate coating solution containing nitrate and chlorate and maintaining the pH of the solution between 2.5 and 2.9.

7. A process which comprises treating ferrous surfaces with an acid zinc phosphate coating solution containing nitrate and chlorate.

8. A process which comprises treating ferrous surfaces with an acid zinc phosphate coating solution containing nitrate and chlorate at a temperature under 170° F.

9. A process which comprises treating ferrous surfaces with an acid zinc phosphate coating solution containing nitrate and chlorate at a temperature between 115° and 170° F. and a pH above 2.5.

10. A process which comprises spraying ferrous surfaces with an acid zinc phosphate coating solution containing nitrate and chlorate maintaining the temperature of the solution between 115° F. and 130° F., and maintaining the pH of the solution between 2.5 and 2.9 by the substantially continuous addition of a neutralizing agent for phosphoric acid, and recirculating and respraying the coating solution.

11. A process which comprises treating surfaces of one of the group consisting of iron, steel, zinc and cadium with a phosphate coating solution containing nitrate and chlorate, and thereafter treating the coated surfaces with a solution of chromic acid.

12. A rustproofing bath suitable for obtaining corrosion-resistant paint-holding coatings on ferrous surfaces comprising an acid phosphate, nitrate and chlorate.

13. A rustproofing bath suitable for obtaining corrosion-resistant paint-holding coatings on ferrous surfaces comprising zinc phosphate, nitrate and chlorate.

14. A solution suitable for addition to zinc phosphate coating baths which comprises a composition made up from nitric acid, phosphoric acid, zinc oxide, and a chlorate.

15. A solution suitable for addition to zinc phosphate coating baths which contains zinc phosphate, nitrate and chlorate.

16. A rustproofing bath suitable for obtaining corrosion-resistant paint-holding coatings on ferrous surfaces comprising zinc phosphate, nitrate, chlorate and copper.

17. A ferrous article carrying corrosion-resistant paint-holding coatings obtained on said article by treatment with a solution containing zinc phosphate, nitrate and chlorate.

VAN M. DARSEY.